J. P. ATTAWAY.
TIRE.
APPLICATION FILED MAR. 22, 1913.
1,091,270.
Patented Mar. 24, 1914.
2 SHEETS—SHEET 1.
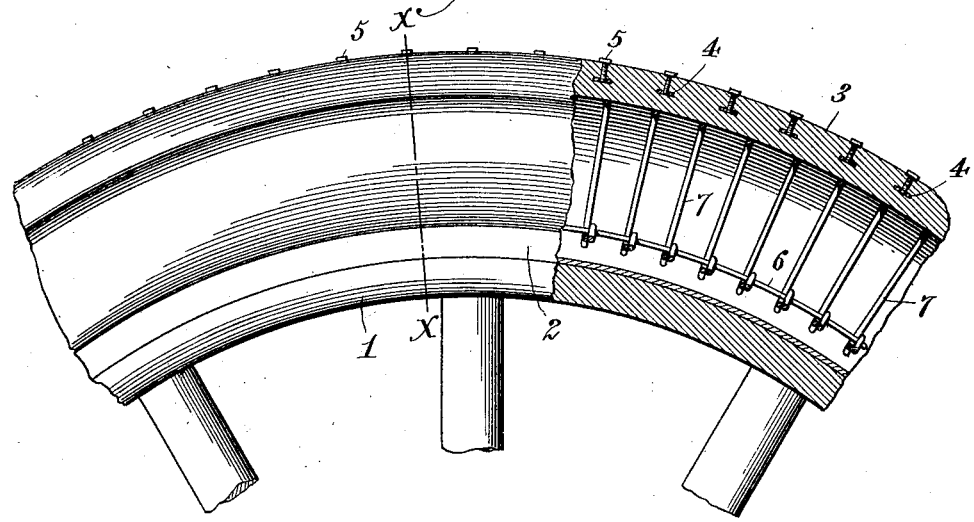
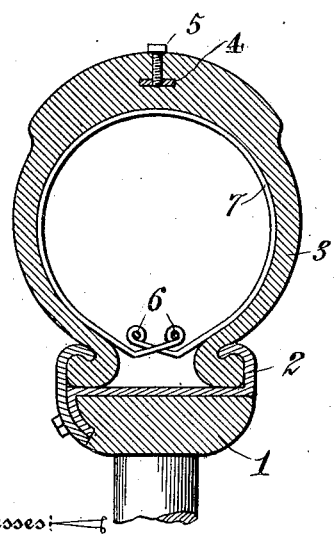
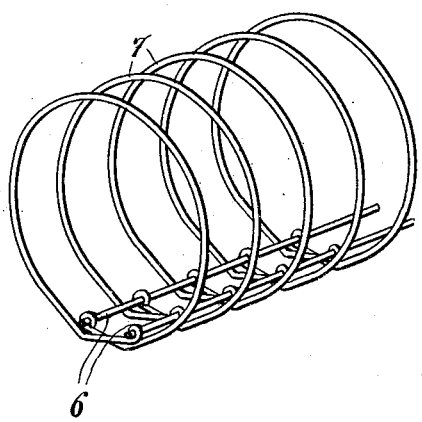
Inventor,
James P. Attaway.
By Victor J. Evans,
Attorney.
Witnesses:
Christ Feinle, Jr.
V. B. Hillyard.

J. P. ATTAWAY.
TIRE.
APPLICATION FILED MAR. 22, 1913.

1,091,270.

Patented Mar. 24, 1914.

2 SHEETS—SHEET 2.

Witnesses:
Christ Feinle, Jr.,
U. B. Hillyard.

Inventor,
James P. Attaway,
By Victor J. Evans,
Attorney.

COLUMBIA PLANOGRAPH CO., WASHINGTON, D. C.

UNITED STATES PATENT OFFICE.

JAMES P. ATTAWAY, OF OSWEGO, SOUTH CAROLINA.

TIRE.

1,091,270.  Specification of Letters Patent.  Patented Mar. 24, 1914.

Application filed March 22, 1913. Serial No. 756,217.

*To all whom it may concern:*

Be it known that I, JAMES P. ATTAWAY, a citizen of the United States, residing at Oswego, in the county of Sumter and State of South Carolina, have invented new and useful Improvements in Tires, of which the following is a specification.

The invention relates to yieldable treads for vehicle wheels and provides a tire embodying a casing and spring means for holding the casing distended, said spring means being of such a tension as to yield and yet support the load and strain.

The invention provides spring distending means of novel form and novel attaching means for securing the casing to the rim of the wheel and adapted to admit of varying the tension of the spring distending means as may be required according to the load and to insure positive connection between the casing and rim.

The invention consists of the novel features, details of construction and combination of parts, which hereinafter will be more particularly set forth, illustrated in the accompanying drawings, and pointed out in the appended claim.

Figure 4:
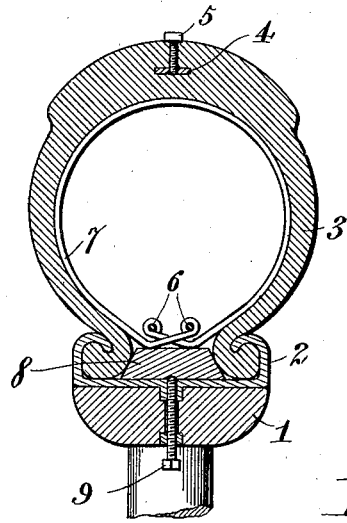
Figure 6:
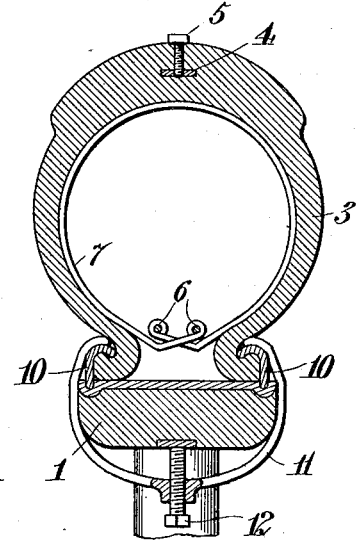
Figure 5:
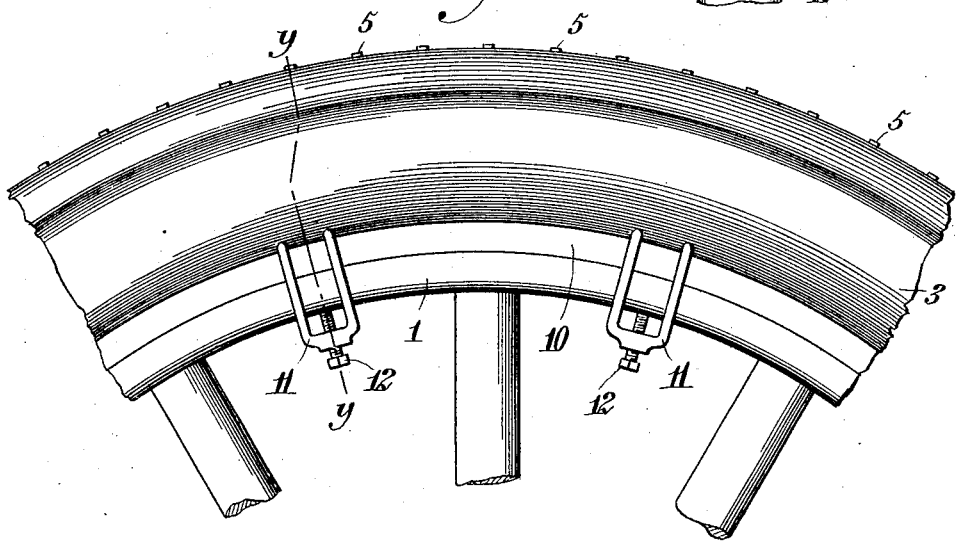

Referring to the drawings, forming a part of the specification, Figure 1 is a side view of part of the rim portion of a vehicle wheel provided with a tire embodying the invention. Fig. 2 is a cross section on the line $x$—$x$ of Fig. 1. Fig. 3 is a detail view in perspective of part of the casing distending spring. Fig. 4 is a sectional view of a modification. Fig. 5 is a view similar to Fig. 1 of a further modification. Fig. 6 is a cross section on the line $y$—$y$ of Fig. 5.

Corresponding and like parts are referred to in the following description, and indicated in all the views of the drawings, by the same reference characters.

The numeral 1 designates a rim which may form a permanent part of the vehicle wheel or a separate part adapted to be detachably fitted to the rim of the wheel after the fashion of the usual demountable rim commonly used in automobiles or like vehicles equipped with pneumatic tires which are fitted to spare rims to be fitted to the wheel when required. The rim 1 is provided at opposite sides with flanges 2, which engage the beads or reinforced edges bordering upon the opening of the casing 3.

One of the flanges 2 may be detachable to admit of the tire being placed quickly in position. The casing 3 may be of any construction and its outer or tread portion is thickened considerably so as to resist wear. It is also preferred to embed washers 4 within the tread portion of the casing for the two-fold purpose of preventing the distending spring from cutting or working its way outward through the casing and to receive calks or studs 5 which prevent skidding, increase the resistance to wear and add materially to the tractive force of the wheel when used as a driver.

The distending spring for holding the casing expanded comprises two rings 6 and a plurality of spring elements 7. The rings 6 are of a diameter to encircle the rim and to fit within the open portion of the casing. Each of the spring elements 7 conforms to the inner wall of a cross section of the casing and is usually of circular form and consists of a length of spring wire bent upon itself with its end portions crossing and secured to the rings 6. The ends of the spring wire or blank forming the element 7 pass beneath the rings 6 before crossing so as to lie between such rings and the rim 1. The spring elements 7 normally tend to expand and are held under compression by the casing when the parts are assembled, as shown most clearly in Fig. 2. It is to be understood that the spring elements 7 may be spaced apart any given distance and that they may be formed of wire of suitable gage according to the load for which the tire is constructed to safely carry. The distending spring completely encircles the rim of the vehicle wheel and is retained within the casing under compression by means employed for securing the casing to the rim.

A ring 8 encircles the rim 1 and is of wedge form in cross section, said ring being expansible. The ring 8 is placed upon the rim 1 with its base in contact therewith and its oppositely inclined sides in contact with the edges of the casing 3 bordering upon the opening, the smaller base of the ring touching the casing distending spring. A plurality of set screws 9 are threaded into the rim 1 with their inner ends engaging the ring 8 and by turning said set screws the ring 8 may be pressed outward, thereby compressing the casing distending spring and at the same time wedging the edges of the casing against the flanges 2 of the rim to insure a firm connection between them and the flanges 2 of the rim 1.

In the construction shown in Figs. 5 and 6 the rim 1 is provided with side rings 10 which are adapted to engage the beaded edges of the casing 3. A plurality of clips 11 are located at intervals in the circumference of the rim 1 with their ends engaging the rings 10, said clips being provided at a middle point with set screws 12 which engage the rim 1, thereby admitting of contracting the rings 10 so as to confine the edges of the casing. The rings 10 when contracted enter grooves formed near the edges of the rim 1. The clips 11 may be of any construction as also the rings 10 so long as they serve to hold the casing and its distending spring in position upon the rim of the wheel.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a vehicle wheel the combination of a rim, a casing fitted upon the rim, transversely spaced rings arranged loosely within the casing, and a plurality of spring elements each conforming to the cross sectional outline of the inner wall of the casing and having its end portions crossing beneath the said rings and secured at its extremities thereto.

In testimony whereof I affix my signature in presence of two witnesses.

JAS. P. ATTAWAY.

Witnesses:
M. H. ANDREWS,
F. W. ANDREWS.

---

Copies of this patent may be obtained for five cents each, by addressing the "Commissioner of Patents, Washington, D. C."